United States Patent [19]

Shasad

[11] Patent Number: 5,303,692
[45] Date of Patent: Apr. 19, 1994

[54] FIREPLACE BARBECUE GRILL-STAND

[76] Inventor: Jamal Shasad, 101 Oceano #12, Santa Barbara, Calif. 93109

[21] Appl. No.: 986,443

[22] Filed: Dec. 4, 1992

[51] Int. Cl.⁵ .................. A47J 37/06; F23H 13/00
[52] U.S. Cl. ..................... 126/506; 126/25 R; 126/152 A; 126/39 M; 108/35
[58] Field of Search ........... 126/506, 152 B, 152 R, 126/39 M, 337 R, 332, 25 R, 25 A; 211/134, 149, 203; 108/115, 117, 120, 125, 127, 35

[56] References Cited
U.S. PATENT DOCUMENTS 3,304,929 2/1967 Brunig ................ 126/25 R
4,987,880 1/1991 Zabala ................ 126/25 R
5,133,333 7/1992 Stout ................... 126/25 R
5,188,089 2/1993 Hamilton ............ 126/25 R X Primary Examiner—Larry Jones

[57] ABSTRACT

A grill stand for use in a conventional fireplace with a grate, for cooking food over the fire. This gill stand consists of a metal grid which has legs, which in one position extend throw the openings in the fireplace grate to support the grill, and in an other position move out of the way for storage. This grill stand may have an adjustable cooking surface, and the legs may adjustable to be used with deferent size of fireplace grates.

5 Claims, 7 Drawing Sheets

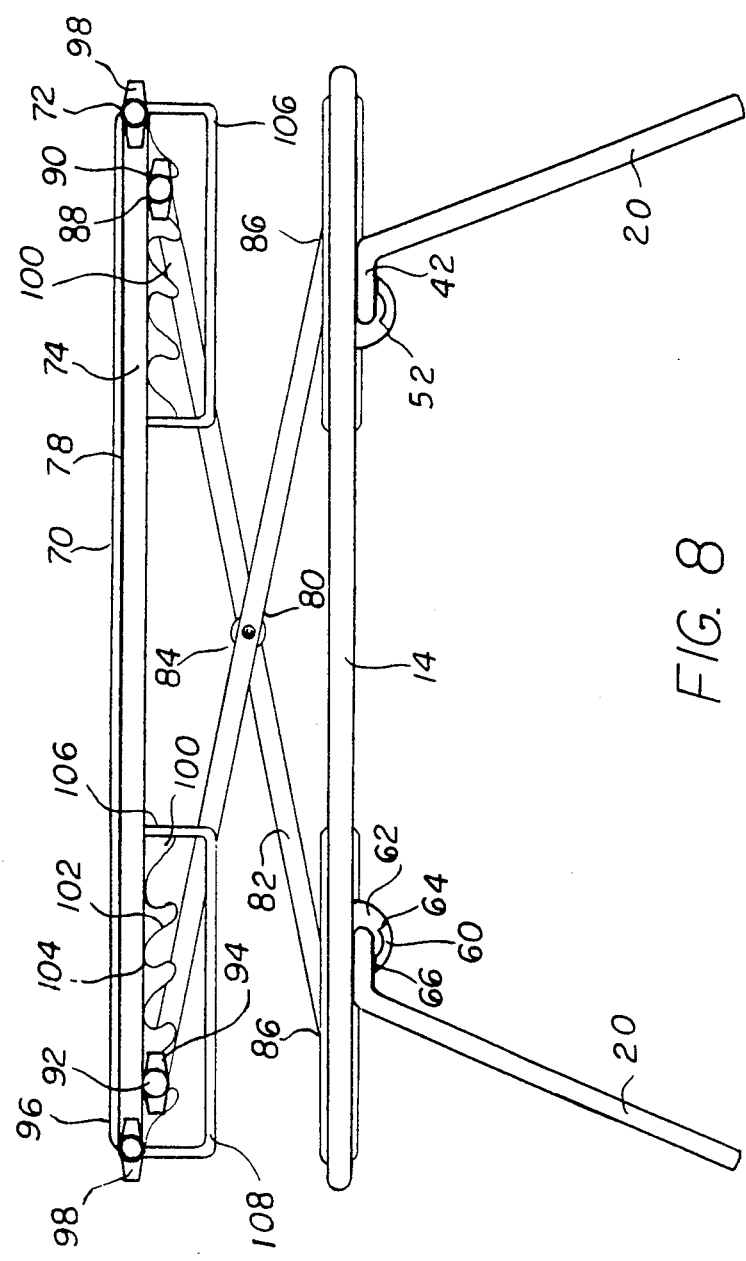

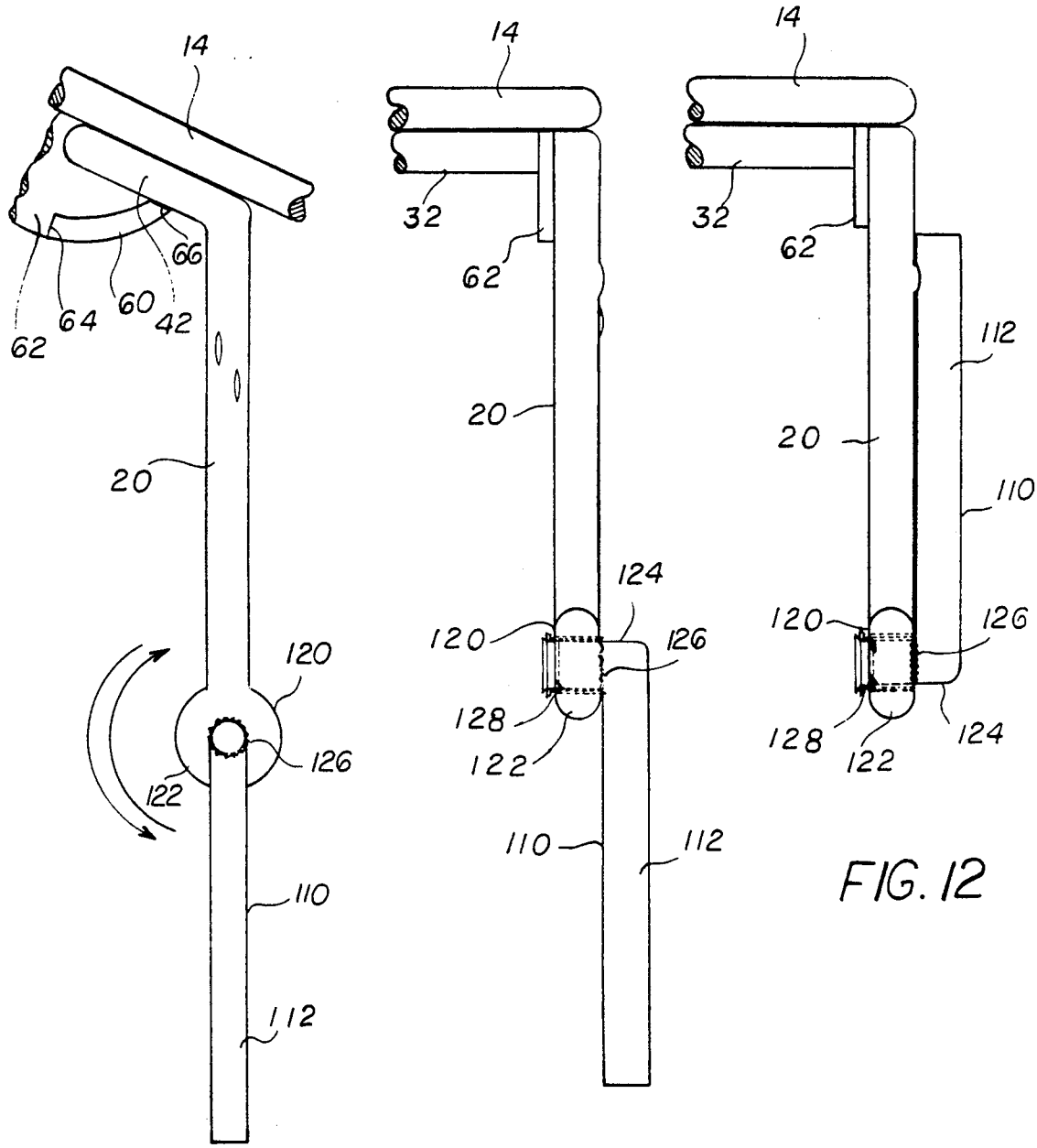

FIREPLACE BARBECUE GRILL-STAND

FIELD OF INVENTION

This invention relates to fireplace cooking or barbecueing grills and more specially to fireplace cooking or barbecueing grills that may be used with existing fireplace grates.

BACKGROUND OF THE INVENTION

The use of home fireplace for cooking goes back to early America, and even earlier in Europe. Now, saving energy is important and making the most of energy that is expended, is necessary. Also reducing pollutants, such as found in gas treated charcoals and lighter fluid, to reduce smog pollution is necessary.

Therefore, it is desirable to be able to cook or barbecue over the fire in a fireplace. Such cooking is fun and efficient, as well as being healthy to the individual, and good for our planet.

So a conveniently and easily usable, strong yet lightweight, grill to facilitate cooking or barbecuing in home fireplace, with existing grate, that is inexpensive to produce, and easy to store when is not in use, is both useful and beneficial.

There are collapsible camp grills, such as taught by L. E. Moore, U.S. Pat. No. 1,244,357; and Le Grady, U.S. Pat. No. 3,905,286; which show grills for use over campfires, but the structural design of these grills, particularly the support structure makes them unsuitable to use in home fireplace. These prior art grills either need to have their legs to be staked into the ground, to stay standing rigid and stable, or their support structure interferes with the structure of the typical log fireplace grate.

SUMMARY OF THE INVENTION

The grill taught by this invention, has each of its legs shaped to extend through the openings in a standard fireplace grill so that the grill can stand on over existing fire on a log grate in a fireplace without any other support.

This feature makes the grill able to function as a complete unit (grill and stand). Nothing else is needed but fire to cook or barbecue food on it.

The grill is designed primarily to be used to cook or barbecue over existing wood fire on a log grate in a fireplace inside a home in conjunction with all sizes of fireplaces and with all makes of grates, regardless of their size and dimension.

BRIEF DESCRIPTION OF THE DRAWINGS

FIG. 8 is a side elevation view of another embodiment of the fireplace barbecue grill of this invention in which the grill height is adjustable.

FIG. 9 is a side elevation view of one of the handles used to move the fireplace barbecue grill according to this invention between its position to adjust the grill height there of.

FIG. 10 is a side elevation view of a pivoting, adjustable height, leg for the grill of this invention.

FIG. 11 is an end elevation view of the pivoting, adjustable height, leg for the grill of this invention, with the leg in the extended or lengthened position.

FIG. 12 is an end elevation view similar to FIG. 11 of the pivoting adjustable height leg for for the grill of this invention, with the leg in the folded or shortened position.

DESCRIPTION OF THE PREFERRED EMBODIMENT

Figure 1:
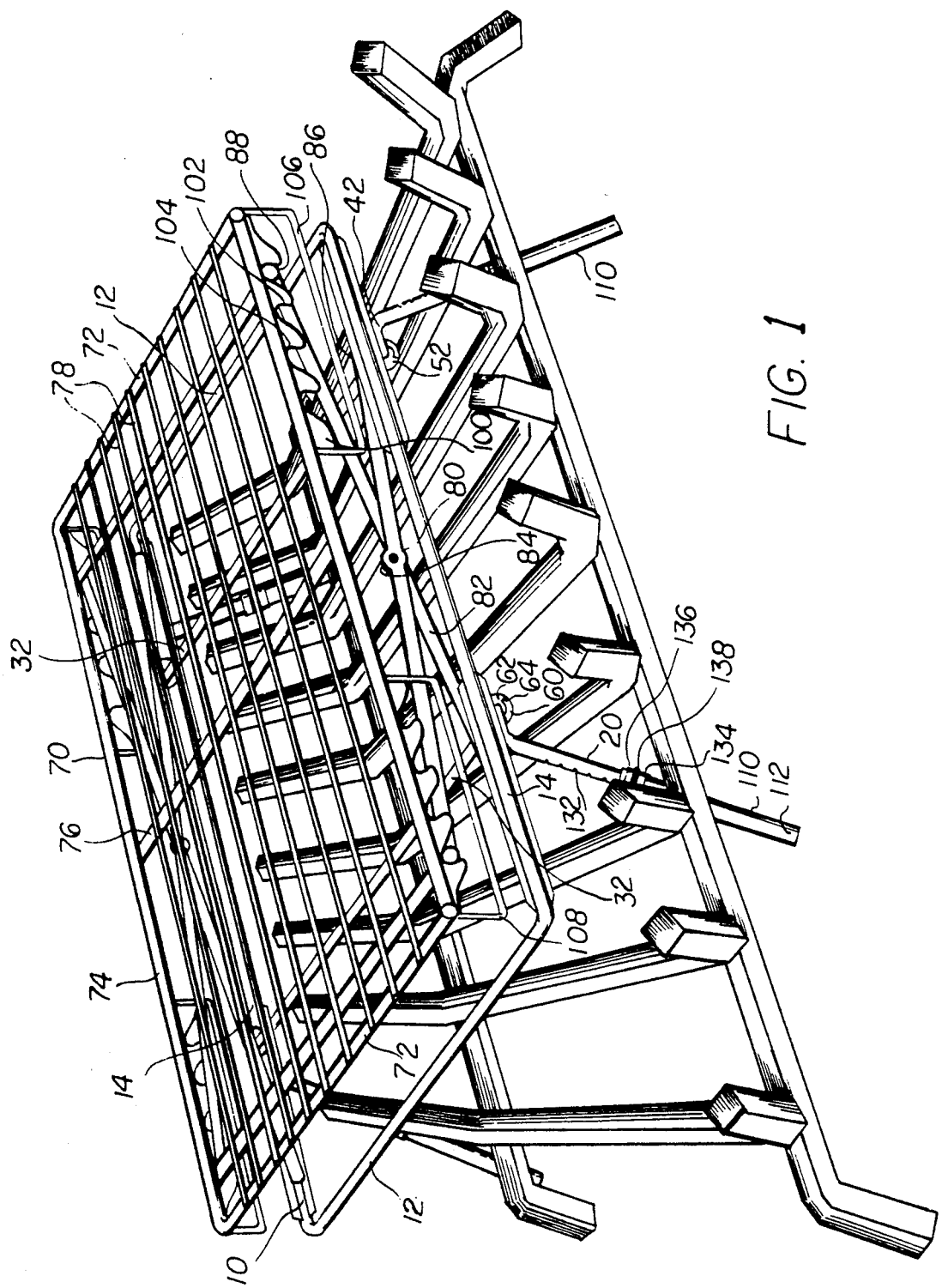
FIG. 1 is a perspective view of a typical fire place environment with a floor supporting a grate for holding wood or other combustibles, and with the grill according to this invention in fireplace ready for use.
Figure 2:
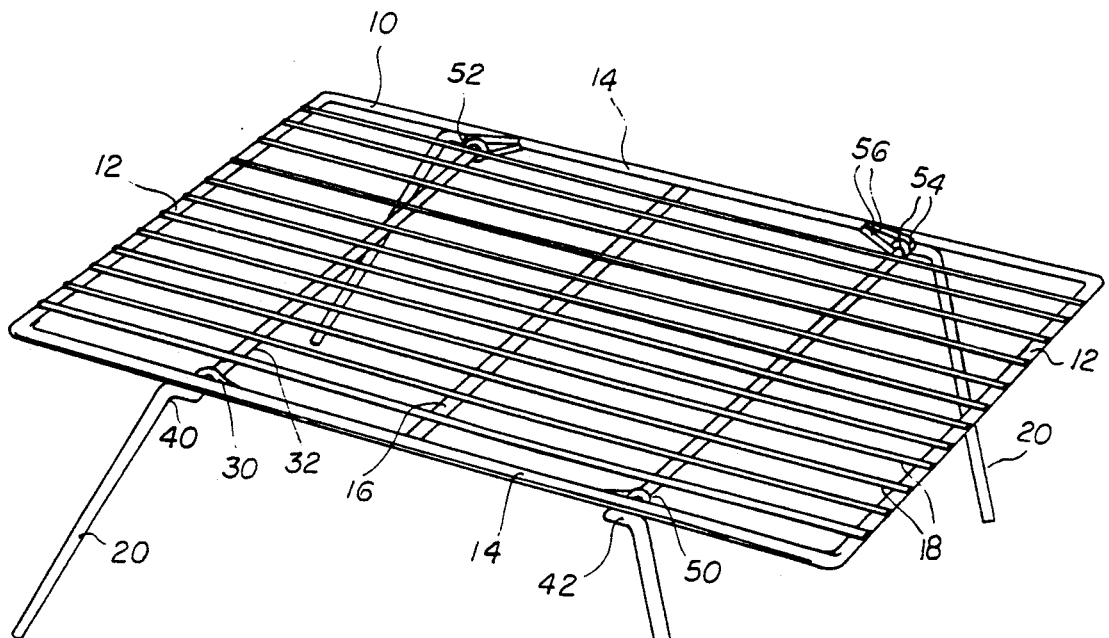
FIG. 2 is a perspective view of the fireplace barbecue grill made in accordance with the present invention, showing a basic version grill with two pairs of leg, each pair made with a common rod, and each pair, extending downwardly and slightly outwardly, to support the grill and capable of being pivoted to a raised position.
Figure 3:
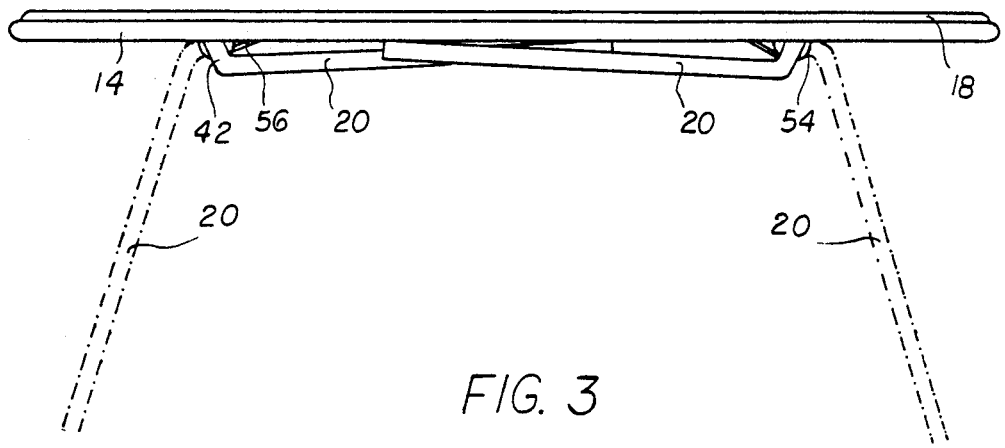
FIG. 3 is a side elevation view of the fireplace barbecue grill shown in FIG. 2 but with legs pivoted into the raised position shown in sold lines and pivoted into the lowered position, shown in dashed ines.

As shown in FIGS. 1 and 2 of the drawings, the fireplace barbecue grill of the invention, essentially consists of main frame 10, made of common steel rod, formed into generally a rectangular shape, by bending and welding. This rectangular endless loop structure, could also be shaped configuration other than rectangular to provide a frame for the grill. The frame is provided with end portions 12 and side portions 14.

A center supporting rod 16, of the same material as the frame rod, is connected, at one end to the middle of the side portion 14 on the inside, and the other end the same way to the middle of the opposite side portion 14. Rod 16 extends between the two side portions 14 half way from and parallel between the two end portions 12 of the frame.

Bars 18 are arranged and secured parallel and essentially evenly spaced in relation to each other. The opposite ends of each of these bars 18 are fixed to the first pair of the frame end portions 12 and these bars 18 are shown generally parallel and evenly spaced between the frame side portions 14.

The main frame 10 is to be positioned over a typical fireplace grate for holding wood and other combustibles. Such a typical fireplace grate has legs attached to longitudinal members which are welded to transverse member with end bent upwards. The legs typically rest on the fireplace bottom which is typically constructed of brick. The longitudinal members and transverse members define openings which restrict the shape of legs that are to be inserted there through, to reach the fireplace brick bottom.

Thus pairs of slender supporting legs 20 are provided, each of these legs 20 is sized to fit between the spaces of the grate. Mounting means 30 is for permanently movably attaching legs 20 to the frame 10. Such mounting means 30 include a transverse supporting axle 32; each of these two axles 32 extend between the upper side portions 14 of the frame 10 until both ends of the transverse axle 32 reach directly underneath the sides portions 14 of the frame 10. Each end of the transverse axles 32 is attached to the upper end of respective legs 20.

In one embodiment, shown in FIGS. 2, 3, 4 and 6 the two positions supporting means 40 is provided at the juncture of the transverse axle 32 and the upper end of the respective legs 20 for allowing the leg 20 to be manually moved between to positions and held in the lowered positions. The two position supporting mean 40 consists of a bent portion 42 of the upper end of the legs, which is bent at 90 degrees to the axle 32 and parallel and directly underneath each side portion 14, The two positions supporting means 40 is then bent downwardly to merge into leg 20. Thus the bent portions 42 are created between the axle 32 and the respective legs 20 and are provided to engage the sides portions 14 of the frame 10 to hold the legs essentially vertically.

Each of the legs 20 is disposed downwardly, and slightly outwardly at an angel, in a manner to strongly support the grill. The bent portion 42 is shaped so as to direct the legs 20 downwardly and slightly outwardly to lock the legs in place and hold them in place by the weight of the grill.

Figure 4:
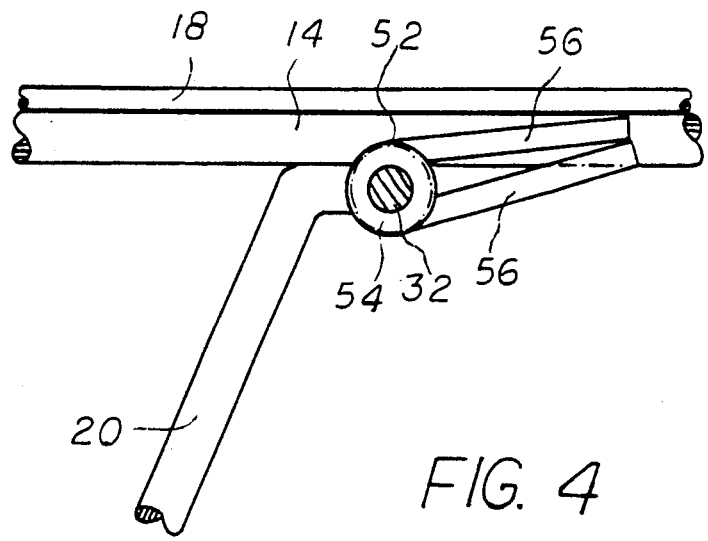
FIG. 4 is a side elevation view of a portion of a grill showing one leg which is in the lowered locked position.
Figure 5:
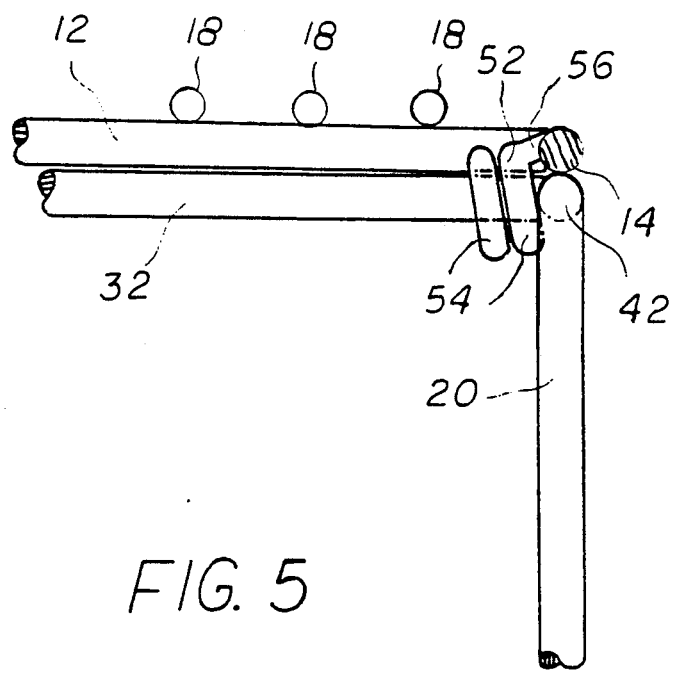
FIG. 5 is a cross section end view of one leg shown in FIG. 4 showing the one leg in the lowered locked position.

Mounting means 50 is provided for holding each axle 32 to the frame 10 while allowing axle 32 to rotate relative to frame 10. As shown in FIGS. 4 and 5, the mounting means 50 may be brackets 52 that are formed of rod shaped in a double loop 54 with tails 56 which wrapped itself twice around the axle 32 at each end, and the tails 56 are secured to the inside of the side portions 14 with the end of the tail portion extending in the direction of the center connecting rod 16.

The way each of the brackets 52 curls around each end of the axle 32 when the legs are in the down position, i.e., the maximum opening position, allows the bent portions 42 to engage the side portions 14 to act as a lock to keep the legs 20 extending downward through the openings in the fireplace grate. The brackets 52 also allow the legs 20 to pivot on the axle 32 into a raised position with certain amount of resistance. Thus resistance also keep the legs in a raised position until they are intentionally opened or lowered in to the lowered position.

Figure 6:
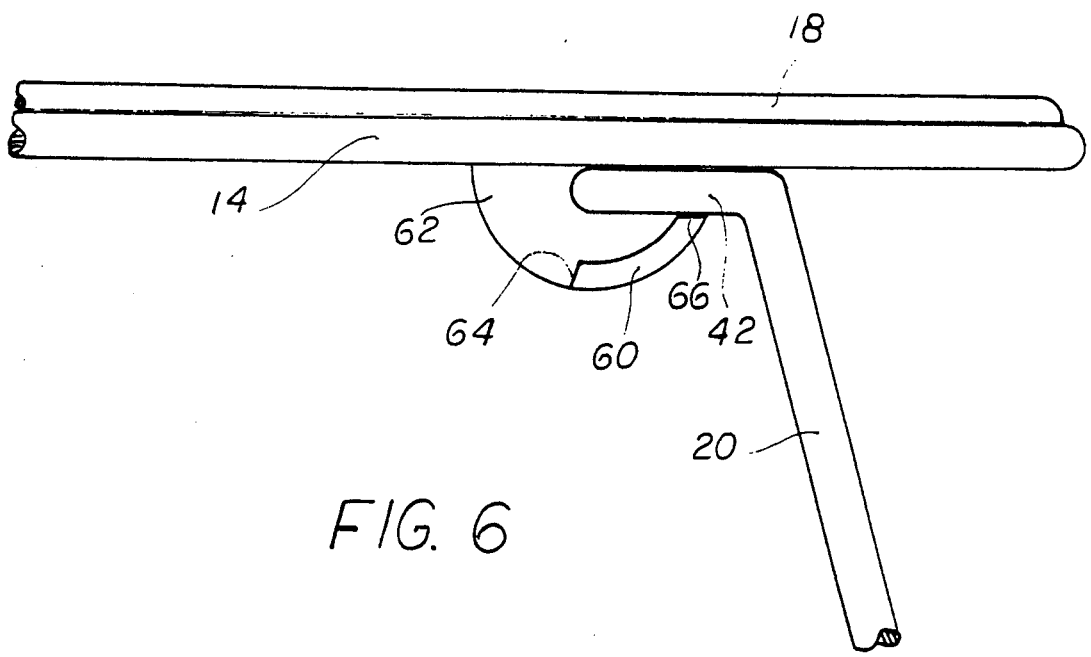
FIG. 6 is a side elevation view of a portion of a different embodiment of the fireplace barbecue grill with the legs pivoted to the lowered position for use.
Figure 7:
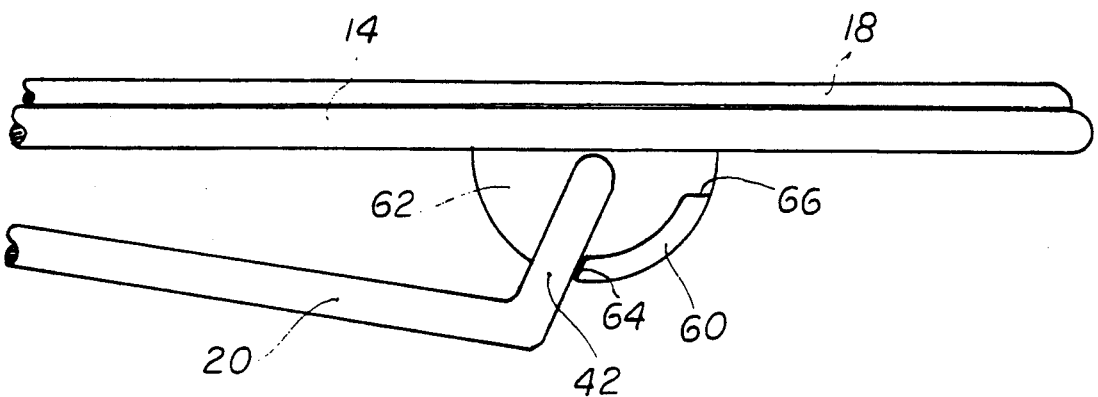
FIG. 7 is a side elevation view of the same portion of the fireplace barbecue grill as shown in FIG. 6 of the drawing but with the legs pivoted to the raised position for storage.

Another embodiment is shown in FIGS. 6 and 7 and uses a different design of a bracket 52, which is affixed to the side portion 14 of the frame 10, with the material the bracket 52 defining a hole through which the axle 32 extends. Bracket 52, in this embodiment has a cam means 60 which is created by a curved plate 62 with an inward shoulder 64 and outward shoulder 66 for engaging the legs 20. The plate 62 is also positioned on the bracket 52 so that the natural spring action of the legs 20 as defined by the axle 32, hold the legs 20 in the raised position against shoulder 64 and hold the legs 20 in the lowered position against shoulder 66. Force must be applied to overcome the natural spring action of the legs 20 to move the legs over the plate between the two positions.

Other features of the grill, according to this invention, are shown in detail in FIGS. 1 and 8. In this embodiment, the grill according to this invention has a movable table means 70 for holding the food to be cooked which is movably mounted to the frame 10 by movable support means 80 for movement between a lowered position and several raised positions to adjust the height of the movable table means 70 above the flames on the combustibles on the grate to adjust the height of the food to be cooked and the heat of the flame which is used for cooking.

In the embodiment shown, the movable mounting means 70 is made of rods welded together to form ends 72, sides 74, center support rod 76 and bars 78 which together form a table for holding food.

The movable support means 80 is located between the table means 70 and the frame 10, and includes two sets of pairs of rods 82, one set on each side, with each pair of rods 82 being pivotally attached at the center by pivot 84. The lower ends 86 of each pair of rods 82 are bent and extended through in an opening formed in a frame 10 to be pivotally attached to the frame 10 at a fixed location. The upper ends 88 of each of the pair of rods and the end portions 72 of the movable table means 70 are shaped to receive handle means 90 consisting of a straight rod 92 and a heat resistant handle 94. Additionally end portions 72 are also provided with handle means 90 for lowering the movable table means 70 consisting of rod 96 and handle 98.

The movable support means 80 also includes a table height locking means 100 for locking the table means 70 in one of its many positions relative to the frame 10. The table locking means shown includes 4 pairs of notched tabs 102 each afixed to the side 74 adjacent the end and having indentations 104. These means also include 4 pairs of retaining guide means 106 made of rods 108 attached to the frame at sides 74 and extending over the locking tabs 102 for holding the handle means 90. In this embodiment, the rods 92 pivot on their lower ends 86, in a scissor fashion, to raise or lower the upper ends 88 by manual pressure on the handle means 90 to slide the rod 92 between indentations 104, thereby raising or lowering the movable table means 70. The retaining guide means 106 keeps the upper ends 88 of the rods 82 closely adjacent to the indentations 104 to prevent the upper ends 88 from getting out of position. The weight of movable table means 70, pushes upon at the ends 88 of rods 92 into the indentations 104 to enable the notched tabs 102 to hold the upper ends 88 therein, to hold the movable table means 60 in a fixed position until manually moved by using the handle means 90.

Another feature of this grill according to this invention is shown in FIGS. 10, 11 and 12. This feature has extension legs means 110 for changing the length of legs 20, while permitting the legs 20 to be slender enough to fit in the openings of a typical fireplace grate. The extension leg means 110, include a movable mounting means 120 to tie the legs 20, and a lower leg 112. In the embodiment shown in FIGS. 10, 11 and 12, the lower leg 112 is pivotally attached to the leg 20 by the movable mounting means 120 consisting of a ring end 122 on the lower end of leg 20, formed in a circular configuration with the upper end of the lower leg 112 having a bent upper end 124 which extends through ring end 122. The ends 122, and 124 have mating notches 126 which engage to hold the upper and lower ends 122 and 112 in various positions. Spring means 128 is provided to hold the ends 122 and 124 in a set position to lock the legs, and for allowing the manual release of the mating notches 126 to allow the pivoting of the legs 20 and 112 between the two positions. When the spring means is not released, it holds the legs 20 and 112 in a fixed position which sets the height of the grill 10 above the grate.

Figure 13:
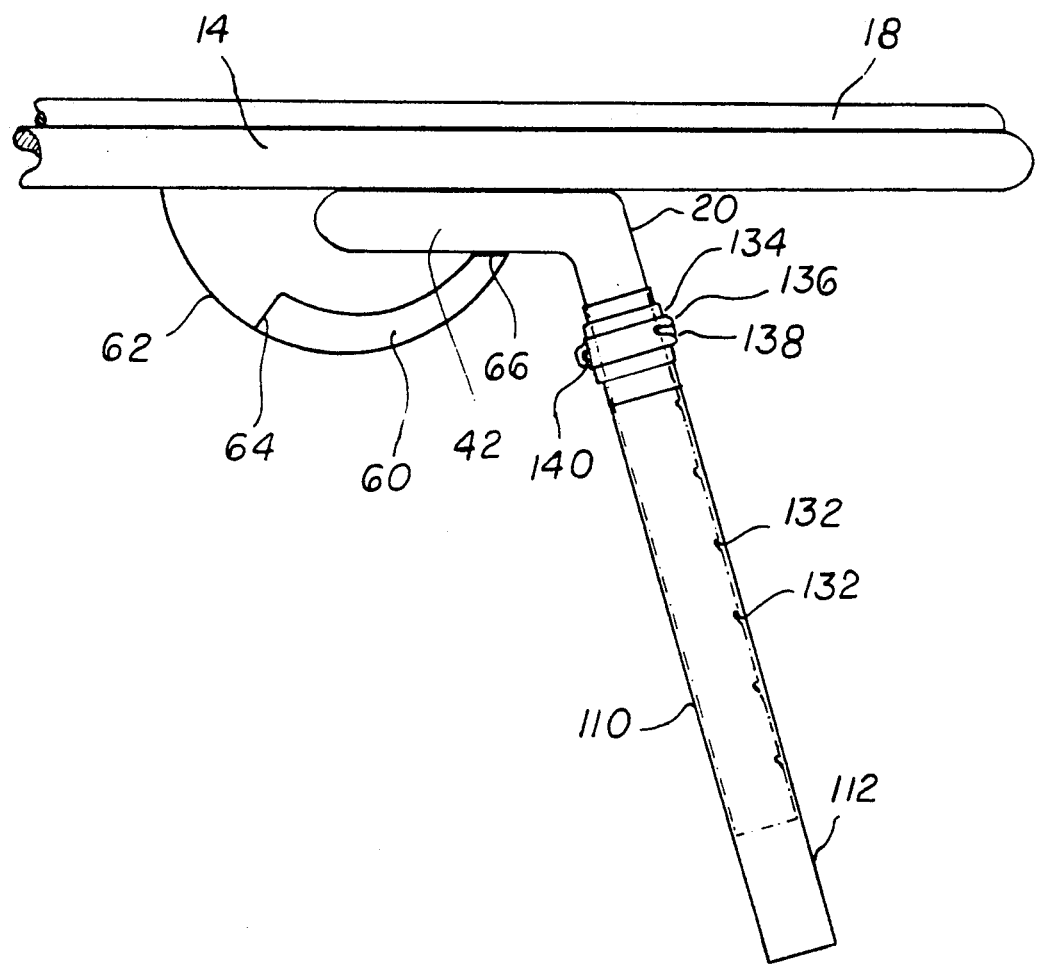
FIG. 13 is a side elevation view of a telescoping, adjustable height leg for the use of the grill of this invention, with the leg shown in the shortened or telescope in position.

Another embodiment of the extension leg means 110 is shown in FIG. 13. In this embodiment the leg 20 has a series of notches 132 cut into the legs a various levels. The lower leg 112 is a tubular member and also has a ring 134 cut in it adjacent the upper end. There is a collar 136 which contain a solid ring 138 and a spring 140 which goes over the lower leg 112 and leg 20. The solid ring 138 in the collar 136 is pushed by the spring 140 into one of the notches 132, to hold the lower leg 112 in one position relative to leg 20. When manual pressure is applied to the solid ring 138, the solid ring 138 moves out of on of the notches 132 and the tubular leg 112 can be manually telescoped relative to leg 20 until the solid ring 138 is released whereupon ring 138 will slide into another notch 132 and hold the lower leg 112 and the leg 20 in a desired length of the leg to hold the grill at a specific heights above the fireplace grate and or to accommodate various heights of fireplace grates.

It is known that it will be obvious that various modifications, changes in the combination, construction and arrangement of parts may be resorted to by those skilled in the art without departing from the spirit of the invention.

I claim:

1. A foldable fireplace grill for use in a typical fireplace with a typical fireplace grate having openings and which rests upon the fireplace floor, comprising:

A horizontal grill of longitudinal and transverse members; at least three legs, sized and shaped to be capable of passing between the openings in the fireplace grate; mounting means permanently attached to the grill and movably mounting said legs for movement between a raised position, close to the grill, and a lowered position, with the lowered position of the legs located such as to allow the legs to pass through the openings of the grate, and with the legs long enough to extend so as to rest on the fireplace floor and support the grill above the grate; and locking means mounted to the grill for preventing the movement of the legs when the legs are in the lowered position, and resting on the fireplace floor.

2. A foldable fireplace grill as in claim 1 wherein mounting means is provided with a cam means for holding the legs in one of their positions, having at least two shoulders so located, that the legs when in the lowered position engage one shoulder so as to be held in that position, and so located that the legs in the upper position, engage the other shoulder so as to be held in that position and that in order to moved between the two positions, the legs must move from engagement with one shoulder to engagement with the other shoulder.

3. A foldable fireplace grill as in claim 1, wherein the mounting means is a bracket formed of a double looped wire with ends fixed to the grill which form an opening, and an axle mounted between the two legs and extending through the hole formed in a double looped wire.

4. A foldable fireplace grill as in claim 1 additionally comprising, a movable table means for holding the items to be grilled; movable support means between the table means and the grill, for movably mounting the table to the grill so that the table could be raised between many positions; and table locking means mounted between the table means and the movable support means for locking the table means in one position relative to grill and being manually releasable to allow the table means upon the application of manual pressure to move between its positions.

5. A foldable fireplace grill as in claim 1 in which at least 2 of the legs have an extension leg means including a lower leg portion, movably mounted to the leg and movable between positions for adjusting the height of the grill above the floor so as to accommodate various heights of grates and various distance of the grill height above the grate, such extension leg means including locking means for locking the legs in one position relative to each other and manually releasable to allow movement between various positions.

* * * * *